(12) United States Patent
Baum

(10) Patent No.: US 7,836,160 B2
(45) Date of Patent: Nov. 16, 2010

(54) METHODS AND APPARATUS FOR WIRETAPPING IP-BASED TELEPHONE LINES

(75) Inventor: Robert T. Baum, Gaithersburg, MD (US)

(73) Assignee: Verizon Services Corp., Ashburn, VA (US)

( * ) Notice: Subject to any disclaimer, the term of this patent is extended or adjusted under 35 U.S.C. 154(b) by 1124 days.

(21) Appl. No.: 10/457,107

(22) Filed: Jun. 9, 2003

(65) Prior Publication Data

US 2003/0200311 A1 Oct. 23, 2003

Related U.S. Application Data

(63) Continuation-in-part of application No. 10/337,106, filed on Jan. 6, 2003, now abandoned.

(60) Provisional application No. 60/455,353, filed on Mar. 17, 2003, provisional application No. 60/346,596, filed on Jan. 8, 2002.

(51) Int. Cl.
  *G06F 15/16* (2006.01)
(52) U.S. Cl. .................. 709/223; 709/203; 709/224; 709/225; 370/235; 370/331
(58) Field of Classification Search .................. 709/223, 709/225, 203, 224; 370/235, 331
  See application file for complete search history.

(56) References Cited

U.S. PATENT DOCUMENTS

| | | | |
|---|---|---|---|
| 5,109,406 A | 4/1992 | Mano et al. | |
| 6,012,088 A | 1/2000 | Li et al. | |
| 6,069,890 A | 5/2000 | White et al. | |
| 6,134,315 A | 10/2000 | Galvin | |
| 6,298,130 B1 | 10/2001 | Galvin | |
| 6,307,920 B1 | 10/2001 | Thomson et al. | |
| 6,335,927 B1 | 1/2002 | Elliott et al. | |
| 6,345,095 B1 * | 2/2002 | Yamartino | 379/355.08 |
| 6,363,065 B1 | 3/2002 | Thornton et al. | |
| 6,393,484 B1 | 5/2002 | Massarani | |
| 6,678,265 B1 | 1/2004 | Kung et al. | |
| 6,680,998 B1 | 1/2004 | Bell et al. | |
| 6,684,250 B2 | 1/2004 | Anderson et al. | |
| 6,738,808 B1 | 5/2004 | Zellner et al. | |
| 6,839,323 B1 * | 1/2005 | Foti | 370/235 |
| 6,856,676 B1 | 2/2005 | Pirot et al. | |
| 6,925,076 B1 | 8/2005 | Dalgic et al. | |
| 6,940,866 B1 | 9/2005 | Miller et al. | |
| 6,975,587 B1 | 12/2005 | Adamski et al. | |
| 7,007,080 B2 | 2/2006 | Wilson | |
| 7,039,721 B1 | 5/2006 | Wu et al. | |

(Continued)

*Primary Examiner*—Jinsong Hu

(57) ABSTRACT

Methods and apparatus for wiretapping IP telephone calls are described. At the time an IP telephone registers its current IP address and telephone number with a soft switch responsible for routing calls to the IP telephony device a list of telephone numbers to be monitored is checked. If the number being registered is to be monitored, information identifying the edge router through which the IP telephony device connects to the IP network is obtained. The edge router is then sent a monitor message with the IP address corresponding to the telephone number to be monitored. IP packets including the specified IP address are then forwarded by the identified edge router to a monitoring station. Packet forwarding may involve packet duplication with the original packets being allowed to continue on to their original destination and the duplicated packets being forwarded or, alternatively, a simple packet redirection operation.

16 Claims, 13 Drawing Sheets

U.S. PATENT DOCUMENTS

| | | |
|---|---|---|
| 7,072,346 B2 | 7/2006 | Hama |
| 7,184,418 B1 * | 2/2007 | Baba et al. .................. 370/331 |
| 7,197,549 B1 * | 3/2007 | Salama et al. ............... 709/223 |
| 7,203,187 B1 | 4/2007 | Richardson et al. |
| 7,320,070 B2 | 1/2008 | Baum |
| 7,359,368 B1 | 4/2008 | Pearce |
| 2001/0040885 A1 | 11/2001 | Jonas et al. |
| 2002/0021675 A1 | 2/2002 | Feldmann |
| 2002/0054667 A1 | 5/2002 | Martinez |
| 2002/0057764 A1 | 5/2002 | Salvucci et al. |
| 2002/0101860 A1 | 8/2002 | Thornton et al. |
| 2002/0136361 A1 | 9/2002 | Stumer |
| 2002/0165835 A1 | 11/2002 | Igval |
| 2003/0063714 A1 | 4/2003 | Stumer et al. |
| 2003/0147518 A1 | 8/2003 | Albal et al. |
| 2003/0161335 A1 | 8/2003 | Fransdonk |
| 2003/0185361 A1 | 10/2003 | Edwards |
| 2003/0187986 A1 * | 10/2003 | Sundqvist et al. ........... 709/225 |
| 2004/0190497 A1 | 9/2004 | Knox |
| 2004/0202171 A1 * | 10/2004 | Hama ...................... 370/395.1 |
| 2004/0249975 A1 | 12/2004 | Tuck et al. |

* cited by examiner

METHODS AND APPARATUS FOR WIRETAPPING IP-BASED TELEPHONE LINES

RELATED APPLICATIONS

The present invention claims the benefit of U.S. Provisional Patent Application Ser. No. 60/455,353, filed Mar. 17, 2003 titled "Methods and Apparatus For Supporting IP Telephony" and is a continuation-in-part of U.S. Utility patent application Ser. No. 10/337,106, filed on Jan. 6, 2003 now abandoned titled "Methods And Apparatus For Determining The Port And/Or Physical Location Of An IP Device And For Using That Information" which claims the benefit of U.S. Provisional Patent Application Ser. No. 60/346,596, filed Jan. 8, 2002 titled "Methods And Apparatus For Determining The Port And/Or Physical Location Of An IP Device And For Using That Information" each of which is hereby expressly incorporated by reference.

FIELD OF THE INVENTION

The present invention is directed to communications systems and, more particularly, to methods and apparatus for monitoring IP-based telephone calls, e.g., for wiretapping purposes.

BACKGROUND OF THE INVENTION

Digital communications networks have continued to grow in importance as people have come to rely on the electronic exchange of information to support both business and personal pursuits. E-mail, the electronic transfer of files, and various other services are made possible by the use of digital communications networks.

The type of digital communications network employed often depends on the size of the network to be implemented, as well as the needs and capabilities of the party or parties implementing the network. Hardware cost and network management complexity are often a factor when choosing the type of network to be implemented.

Networks limited to a small geographical region, e.g., home or single office location, are frequently called local area networks ("LANs"). LANs are often privately-owned networks within a single building or small campus. LANS are widely used to connect personal computers and workstations at a single location, e.g., company office or residence, to one another and to shared resources such as printers and/or local centralized file storage.

One popular type of LAN, an IEEE 802.3 standard based LAN is popularly called Ethernet. Ethernet is a bus based broadcast network with decentralized control. When using Ethernet, data, e.g., messages, information and signals are transmitted in Ethernet using frames. Ethernet devices broadcast and receive frames over the shared bus over which the frames are broadcast. The format of an IEEE 802.3 frame 100 is shown in FIG. 1. Each frame 100 starts with a 7 byte preamble 102 containing a preset bit pattern. The preamble 102 is followed by a start of frame byte 104 which includes the bit pattern 10101011 used to denote the start of the frame. Next come two addresses, a destination address 106 and a source address 108. The high-order bit of the destination address is a 0 for ordinary addresses and 1 for group addresses. Group addresses, in contrast to individual device addresses, allow multiple stations, e.g., devices coupled to the Ethernet, to receive frames including a single group address. When a frame is sent to a group address, all the stations in the group receive it. Sending to a group of stations is called a multicast. The address consisting of all 1 bits is reserved for broadcast. A frame containing all is in the destination field, indicating a broadcast, is delivered to all stations on the network.

Six byte global Media Access Control (MAC) Ethernet device addresses are assigned by a central authority to ensure that no two stations on the same Layer 2 network, e.g., Ethernet LAN, have the same global address. Manufacturers of Ethernet devices, e.g., networking boards, request a block of addresses from the central authority to assure that no two Ethernet boards are assigned the same global MAC address. The boards then send and receive frames based on the 48-bit MAC address programmed into the board by the manufacturer. Because source MAC address information is inserted into Ethernet frames by the Ethernet boards, the source address 108 in an Ethernet frame is usually accurate and is difficult to fake.

Since Ethernet MAC address are unique at least on the same Layer 2 network and potentially globally, any device on a Layer 2 network can address any other device on the network by just using the right 48 bit MAC address assigned to the device being addressed.

MAC addresses are data link layer addresses. The data link layer corresponds to the second layer of the seven layer OSI (Open Systems Interconnection) Reference Model. As a result, Ethernet LANs and other LANS which use data link layer addresses are sometimes called Layer 2 networks.

In addition to the address information 106, 108 the Ethernet frame includes a length of data field 110, data field 112, padding field 114 and a checksum field 116. As will be discussed below, information intended to be transmitted over an IP based network may be included in the data field 112.

While Layer 2 networks are well suited for implementing LANs, e.g., at relatively small sites, it is often desirable to connect devices, e.g., computers located on different LANs. Layer 3 networks, which rely on network protocols, e.g. TCP/IP protocols, are often used for interconnecting Layer 2 networks. Layer 3 packets, e.g., IP packets, are often encapsulated in Layer 2 frames to extend the reach of the Layer 3 network to host devices on the Layer 2 network. This permits Layer 2 signaling and frames to be used for transmissions of data over the Ethernet while preserving Layer 3 addressing information for transmission over the Layer 3 network. The network resulting from interconnecting one or more Layer 2 and Layer 3 networks is often referred to as an internet.

The Internet is a well-known worldwide internet that is used to connect computers and other devices located at universities, governments offices, businesses and individuals together.

FIG. 2 is an extremely simplistic representation of the Internet 200. As illustrated, the Internet 200 includes a plurality, e.g., first and second, Layer 2 networks 201, 203, coupled together by a Layer 3 network 205. While only two Layer 2 networks, e.g., Ethernet LANs, are shown, many thousands of such networks may be part of the Internet. Edge routers, e.g., multi-protocol routers, capable of converting between Layer 2 and Layer 3 formats and addressing schemes, are often used to connect Layer 2 networks to Layer 3 networks. In FIG. 2, first edge router 216, connects the first Layer 2 network 201 to the Layer 3 network 205. Similarly the second edge router 218 connects the second Layer 2 network 203 to the Layer 3 network 205.

In the FIG. 2 example, two host devices 208, 210 are shown coupled to the first Ethernet bus 204, used to implement the Ethernet LAN 201, while third and fourth host devices 212, 214 are shown coupled to the second Ethernet bus 206 used to implement Ethernet LAN 203. While only two hosts are shown on each Ethernet LAN it is to be understood that a large number of hosts may be coupled to any one of the Layer 2 networks, corresponding to Ethernet busses 204, 206, at any given time.

Routers, serve as forwarding devices and, optionally, protocol conversion devices. In the FIG. 2 diagram, edge routers 216 and 218 have the capability of converting between Ethernet frames and IP packets, and vice versa, using one or more tables relating IP addresses to MAC addresses.

Routers 222, 224, 226 and 228 internal to the Layer 3 network form part of what is sometimes called the Internet backbone. Since these routers do not need to handle Ethernet frames, they do not include the protocol conversion functionality present in the edge routers 216, 218. Groups of routers 216, 218, 222, 224, 226, 228 managed by a single administrator is often called an Autonomous System (AS). The Internet includes several AS which are connected to each other. Each AS may include one or more DHCP (Dynamic Host Configuration Protocol) servers which are responsible for assigning IP addresses to host devices connected to the AS. In FIG. 2, a single DHCP server 220 is shown coupled to edge routers 216, 218.

Unlike LANs which use data link layer addresses, the Internet uses Layer 3 (Network layer) addresses, e.g., IP Addresses, for purposes of identifying source and destination devices and determining the appropriate route upon which packets should be transmitted. Source and destination IP addresses are included, along with data, in IP packets used to transmit information across the Internet. Every host and router on the Internet has an IP address which encodes its IP network number and host number. The combination is unique, no two machines have the same IP address.

Exemplary IP addresses are 32 bits long and are used in the Source address and Destination address fields of IP packets. FIG. 3 is a diagram 300 which illustrates the standard 32 bit format for IP addresses. Note that host addresses are divided into different classes (A, B, C) with different numbers of bits allocated to the network number and host portion number in each address class. From a management perspective, system administrators may divide the host number portion of a 32 bit IP address into a subnet portion 402 and a host portion 404 as illustrated in block 400 of FIG. 4. In such embodiments, within the network defined by the network portion of the IP address, a subnet mask is used at the routers within the network to distinguish between the host portion 404 and the rest of the 32 bit IP address and thereby allow for routing within the network based on the subnet portion of the address.

The demand for IP address continues to grow and, with fewer bits than are used for MAC addresses, there are considerably fewer IP addresses available for allocation. Given the demand for IP addresses and the limited supply, IP addresses are leased from a central authority responsible for overseeing their allocation. Internet service providers, may lease a large number, e.g., a block of IP addresses, which the provider then sub-leases to end users, e.g., host devices.

As a result of the lease (actually the sub-lease) process, end users obtain an IP address which is subject to lease restrictions including the right to use the IP address for a limited period of time. IP addresses leased for extended periods of time, e.g., a year or more, are often termed "static" IP addresses. Static IP addresses are used for applications such as Web site hosting where the Internet connection is likely to remain active and in use for extended periods of time. Users normally pay a premium for static IP addresses.

With regard to individual Internet users, IP addresses are more commonly leased to end users on a dynamic basis. Internet service providers frequently use a DHCP server to assign users IP addresses for a limited lease time when they seek to access the Internet, e.g., from a host device coupled to the Internet by way of a Layer 2 network. FIG. 2 illustrates a single DHCP server 220 coupled to the two edge routes 216, 218 to oversee IP address allocation. In practice, the Layer 3 network 202 may include multiple DHCP servers with each server being responsible for allocating IP addresses to users on a different network or subnet. The system administrator responsible for overseeing an AS determines the relationship between DHCP servers, sets of IP addresses allocated by each of the DHCP servers and the edge routes which connect users to the DHCP servers for IP address assignment.

Once an IP address is leased to a host, e.g., user, if the host remains active beyond the lease term, the lease may be extended or a new IP address assigned to the host from the available pool of IP addresses at the end of the first lease term.

When a user intends to stop using the IP address, the user's device, e.g., host device 208, normally signals to the DHCP server that assigned the IP address that the address is being released. This allows the address to be added to the pool of available addresses and reused. In the event that a release message is not received prior to the IP address lease timing out, and the DHCP server encounters a shortage of addresses in the pool of available addresses, the DHCP server may poll devices to which it allocated IP addresses to see if they are still active. Failure to receive a response may result in the DHCP adding the IP address assigned to the non-responding device back into the pool of available IP addresses.

Thus, unlike MAC address which are fixed for the life of a product by the manufacturer, the IP address assigned to a particular host device can change from moment to moment. Accordingly, in contrast to MAC addresses which are fixed for the life of a product by the manufacturer, there is no permanent fixed relationship between a physical device and the IP address assigned to the device.

Many contemplated IP applications could benefit from reliable information about the location and/or identity of a host device using an IP address. The dynamic allocation of IP addresses and re-use of IP addresses discussed above, greatly complicates attempts to accurately correlate specific devices and/or physical locations with an IP address.

The problem of associating IP addresses with physical locations is further complicated by the manner in which IP addresses are assigned and used. Blocks of IP addresses are assigned by the central authority to different network providers based on the size of their networks. Unlike zip codes or telephone number area codes, assignment of IP addresses is independent of geographic location. Accordingly, IP addresses do not inherently convey geographic location information as do, for example, zip codes used by the post office or the area code portion of a telephone number.

Reliable location information is also difficult to obtain in an IP network because IP based routing relies, in most cases, on the intelligence of the network to determine the routing path to a specified destination address. The host need not, and in most cases does not, know the physical location of the destination device to which it is sending packets or the route over which the transmitted packets will be conveyed. In addition, routers in an IP network usually only need to determine the next router in a path based on an IP address and therefore often do not include detailed topology information relating to large portions of an IP network. While shielding end devices and routers from having to make end to end routing decisions has many advantages, the lack of information about the physical devices corresponding to IP addresses poses problems in many contemplated IP based applications.

IP based services, those based on private internets and the larger Internet are continuing to grow in importance. IP and the Internet are beginning to be used for a wide range of applications such as music file sharing, news delivery, software distribution, etc. IP and Internet applications which are expected to grow in importance in the future include Internet telephony and video on demand services. In the case of Internet telephony voice signals are exchanged over the Internet through the use of packets including voice data.

The need to provide law enforcement with the ability to monitor telephone calls, whether or not they are based on IP, is of great interest given present day concerns over the need to monitor terrorist activity for law enforcement purposes. In wiretapping applications, the goal is to intercept the communications associated with a particular individual or device for which the wiretap is authorized without interfering with or monitoring the communications of other individuals.

In order to encourage communications service providers to deploy equipment and software which will enable law enforcement to implement wiretaps, the U.S. Federal government provides financial compensation to communications companies to cover the costs associated with supporting wiretapping in communications networks. The law supporting such reimbursements is sometimes referred to as COLLEA.

One problem with placing a wiretap on an IP telephone is that the IP telephony device can access an IP network from any one of a plurality of ports corresponding to different physical locations. In addition, the access port used at any given time by a particular IP telephony device may carry communications corresponding to the IP telephone for which a wiretap is authorized and communications corresponding to other devices for which a wiretap is not authorized.

IP telephony devices normally register with a registration/routing device, e.g., a soft switch, which is then responsible for providing IP address information used to route calls. The registration process normally involves providing the soft switch with telephone number and current IP address information. This information is then used by the soft switch to direct IP telephony calls.

While a soft switch knows the IP address being used by an IP telephony device at any given time, and is contacted for routing information associated with calls directed to IP telephone numbers serviced by the soft switch, the soft switch is normally not aware of an IP telephony device's physical location or physical point of attachment to the IP network. Furthermore, the voice portion of a call is generally not routed through the soft switch which is used for registration purposes and to provide the IP address used to route a call. As a result, the soft switch does not provide a suitable location where calls can be monitored since the voice portion of an IP call is generally not available at the location of the soft switch.

The problem of identifying a suitable point in the network where an IP telephony call corresponding to a particular telephone number can be monitored is complicated by the soft switch's lack of telephony device physical location information and by the fact that the telephony devices point of network attachment may be different at different times, e.g., depending on the location the user selects to attach to the IP network at different points in time.

Wiretapping of IP based calls presents many challenges. The current inability to wiretap IP based telephone calls has many law enforcement officials concerned given the expected growth in IP telephony over the next few years.

Ideally, it would be desirable if law enforcement personal could monitor a telephone call placed from or received by an IP telephony device and record the telephone call regardless of the port, e.g., point of attachment, used to connect the IP telephony device to the IP communications network. From both a privacy and legality standpoint, it is desirable that communications corresponding to a targeted IP call be intercepted and recorded without recording communications corresponding to IP communications sessions, which are not authorized by a warrant, to be monitored. This is particularly challenging given that multiple users may connect to an IP network through a common shared router port.

In view of the above discussion, there is a need for methods and apparatus for monitoring IP-based telephony transmissions, e.g., telephone calls.

SUMMARY OF THE INVENTION

The present invention is directed to methods and apparatus for tapping an IP telephony call without the knowledge of the party being monitored. The techniques of the present invention have the further advantage of allowing an IP telephone call from a specific IP telephone device to be tapped regardless of which port of an IP edge router is used to place or receive the call. It has the additional advantage of allowing the tap to be limited to communications to/from a particular IP telephone thereby avoiding unauthorized monitoring of other communications.

IP telephony devices register with a soft switch used to control IP call routing. The soft switch stores the telephone number of an active IP telephone and the IP address being used by the telephone at any given point in time. Calls directed to an IP telephone are routed by the soft switch based on the stored telephone number and associated IP address information.

In accordance with the present invention, the soft switch is directed to detect calls to/from a wiretapped IP telephone. When a call to/from a telephone number for which a wiretap is activated is detected by the soft switch, the soft switch determines the IP edge router port servicing the IP telephone device, e.g., using the telephone's IP address and edge router port determination techniques discussed in regard to invention 1.

Once the IP edge router and port servicing the IP telephone which is tapped is discovered, the edge router is contacted. The edge router is instructed to implement the wiretap in one of two ways. The first technique is to simply duplicate IP packets having the IP address associated with the tapped telephone number and to forward them to a designated storage and/or monitoring facility. The second technique is to instruct the edge router to redirect the flow of data through the identified port so that it passes through a network operations center which will duplicate the data packets corresponding to the tapped telephone. The data flows through the network operation center and onto its intended destination through the edge router in a manner that is generally undetectable to the party being monitored.

Numerous additional embodiments, features and applications for the methods and apparatus of the present invention are discussed in the detailed description that follows.

DETAILED DESCRIPTION

Figure 1:
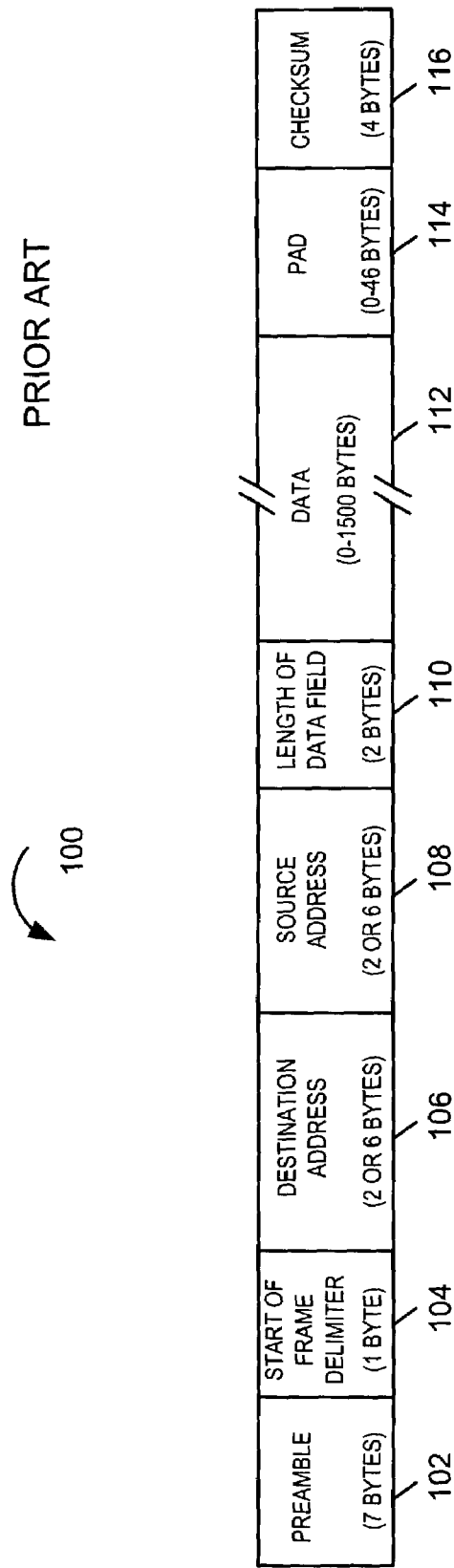
FIG. 1 illustrates an Ethernet frame.
Figure 2:
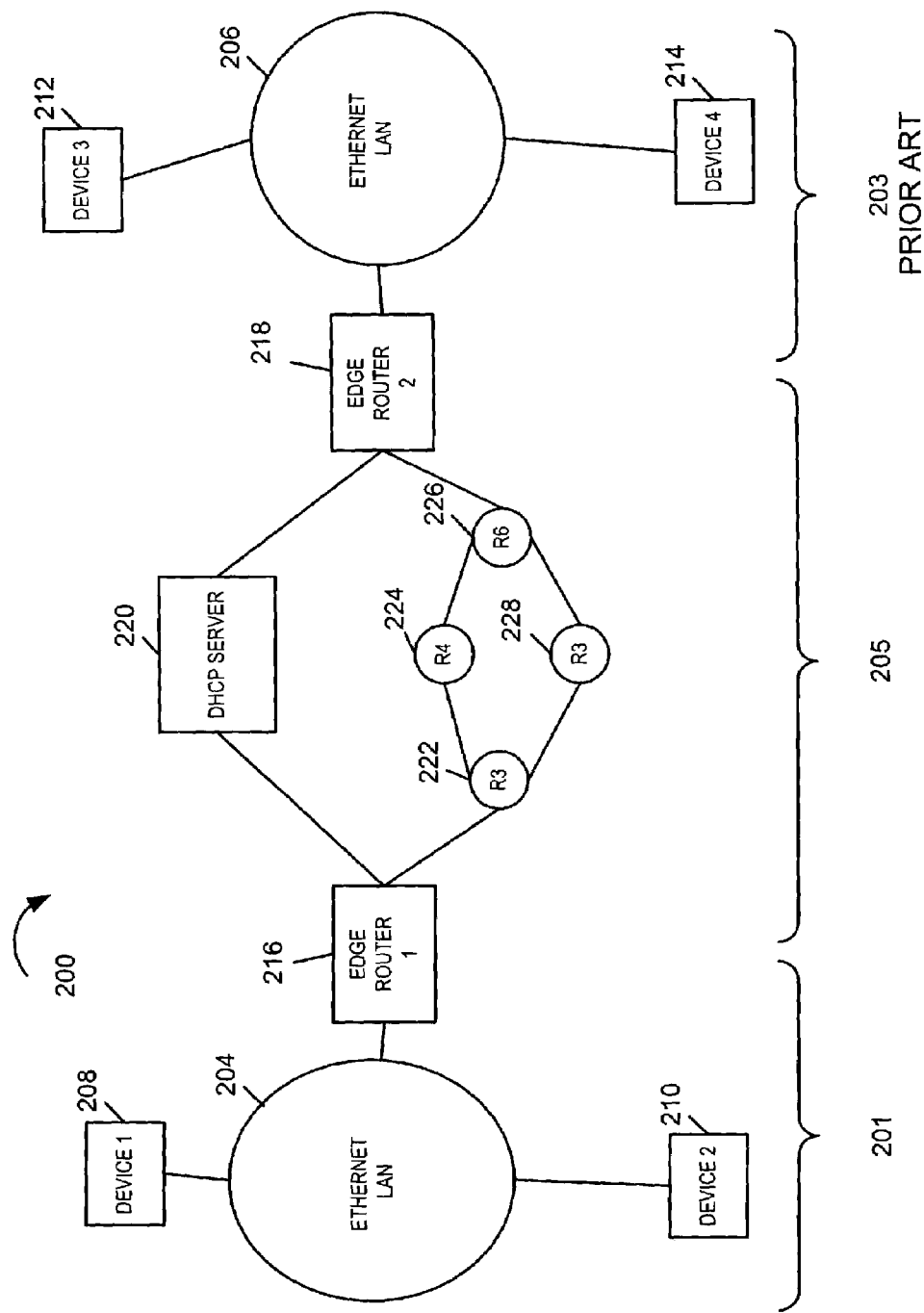
FIG. 2 is a simplified Internet diagram.
Figure 3:
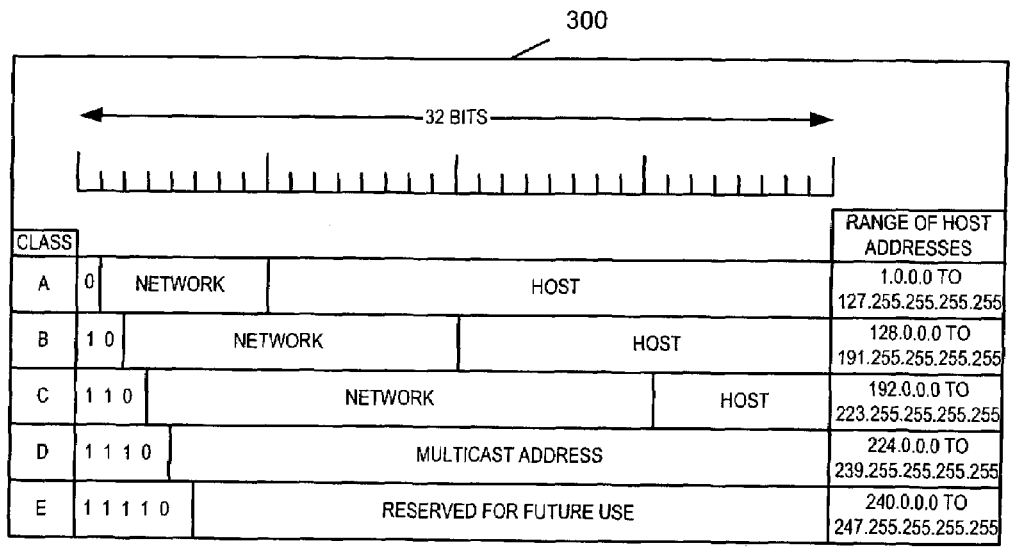
FIG. 3 illustrates the 32 bit IP addressing scheme used for Internet addresses.
Figure 4:
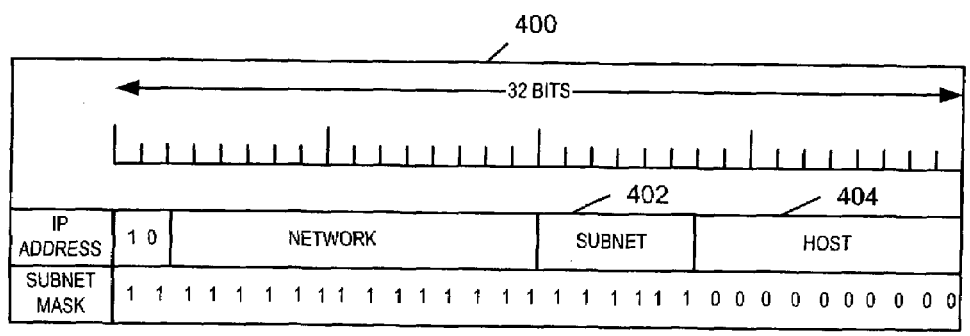
FIG. 4 illustrates the components of a 32 bit Internet address having the illustrated subnet mask.
Figure 5:
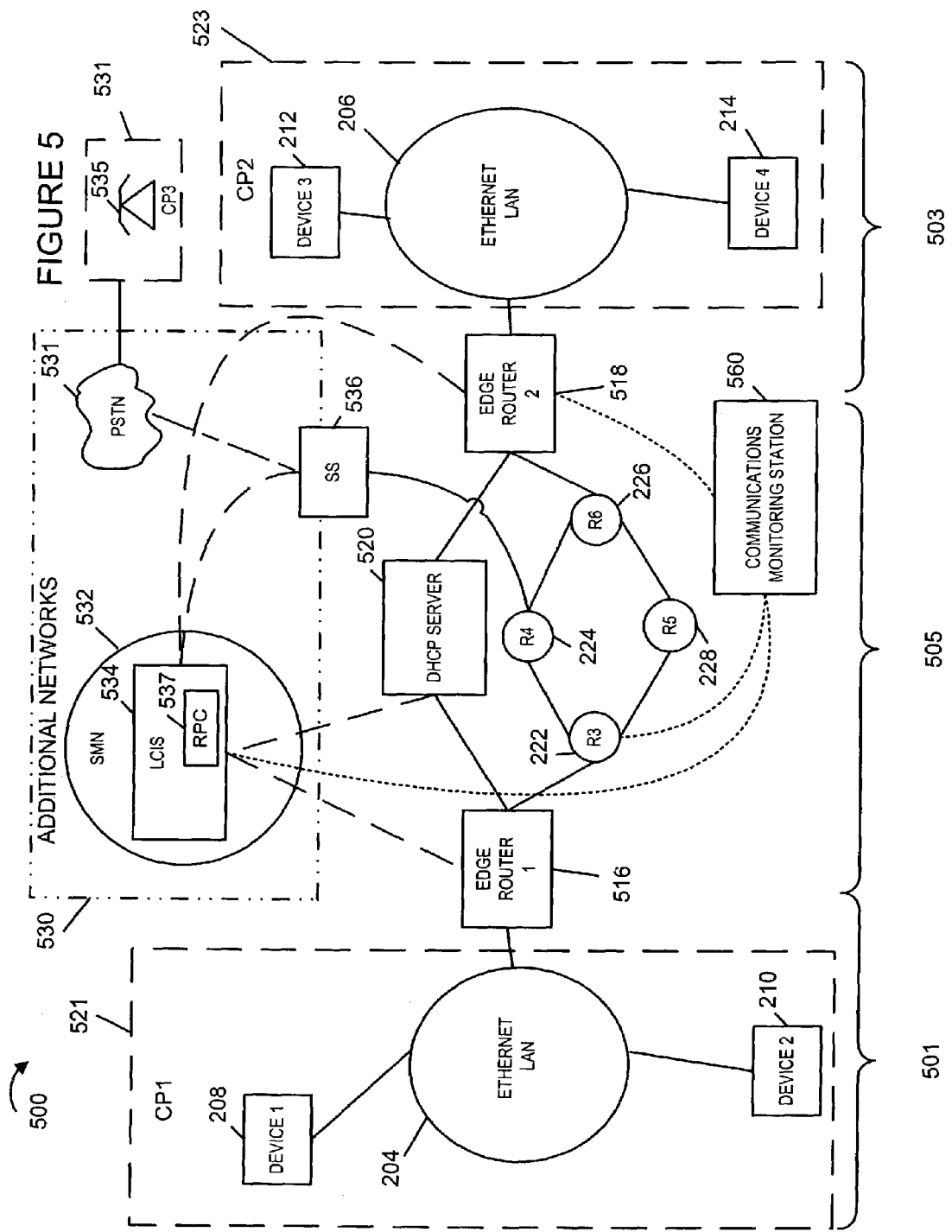
FIG. 5 illustrates a communications system implemented in accordance with the invention.

FIG. 5 illustrates a communication system 500 implemented in accordance with the present invention. As will be apparent from a review of FIG. 5, the communication system 500 has many elements which are the same as or similar to the elements of the existing Internet as shown in FIG. 2. Elements in FIG. 2 and FIG. 5 which are the same as, or similar to, one another are indicated using the same reference numbers in both figures. Such elements will not be described again in detail.

The system illustrated in FIG. 5 includes first and second Layer 2 networks 501, 503, e.g., Ethernet LANs, coupled together by a Layer 3, e.g., IP based, network 505. In addition to the IP based network 505, the system 500 includes additional networks 530. The additional networks include a service management network (SMN) 532 and a public switched telephone network 531. One or more conventional (e.g., non-IP) telephone devices may be coupled to the PSTN 531. In FIG. 5, for purposes of illustration, a single telephone 535, located at a customer premise 531, is shown coupled to the PSTN 531. In reality many such telephone devices located at different customer premises are coupled to the PSTN 531.

The first Layer 2 network, e.g., LAN 501, includes host devices 208, 210 coupled to Ethernet bus 204. The LAN 501 is located at a first customer premise (CP) 521. Similarly, the second Layer 2 network 503 including host devices 212, 214 coupled to Ethernet bus 206. The LAN 503 is located at a second CP 523. Each CP 521, 523, corresponds to a single physical location, e.g., an office building or home, for which location information can be stored in the SMN 532.

An IP based network 505 couples the first and second Layer 2 networks 501, 503 together. The IP based network 505 includes first and second edge routers 516, 518, a DCHP server 520, core routers 222, 224, 226, 228, a soft switch (SS) 536 and a communications monitoring station 560.

The first and second edge routers 516, 518 serve as the interface between the Ethernet LANs 501, 503, respectively, and the IP 505. While the edge routers 516, 518 perform the same functions as edge routers 216, 218 as will be discussed further below, they also include routines for responding to requests to identify a router port corresponding to an IP or MAC address supplied as part of a port information request.

The DHCP server 520 is responsible for dynamically assigning IP addresses while the SS 536 is responsible for interfacing between the IP network 505 and public switched telephone network (PSTN) 531. The soft switch stores information associating IP address of telephone devices with telephone numbers. It is responsible for routing IP telephone calls between IP telephone devices over the IP network 505 and for performing the necessary protocol conversions required to bridge and route telephone calls between the IP domain and the PSTN 531. Routing of telephone calls between the IP and PSTN domains may be required, e.g., when a telephone call between an IP device and a conventional PSTN telephone occurs.

Also included in the IP based network 505 is communications monitoring station 560. This station is responsible for recording any calls that are listed to be monitored. Transmissions to and from communications monitoring station 560 may be implemented using encrypted messages over IP and the Layer 3 network 505, or alternately through a dedicated protocol and through a private network.

To facilitate the secure exchange of customer and management information between system components, e.g., routers and servers in the system 500, the system 500 includes a secure management network (SMN) 532. The SMN 532, which may be implemented using IP, is in addition to the Layer 3 network 505.

As an alternative to using a separate network for the exchange of management and customer information, secure communications channels can be implemented between system components, e.g., routers and servers, using encryption and/or other virtual private networking techniques. Accordingly, customer and management may be transmitted over separate physical communications channels or secure communications channels provided using existing communications links between network elements.

Various elements are incorporated into the SMN 532 including a location and customer information server (LCIS) 534 implemented in accordance with the invention. As will be discussed below, in accordance with the present invention, the LCIS 534 includes a router-port to customer information (RPC) database 537. The RPLC database 537 includes sets of customer records created, e.g., when a customer subscribers to an IP service provider. As will be discussed below each record may include, e.g., customer premise location information, name, address and landline telephone number information. Each customer record is correlated to an edge router and port which is assigned to be used by the customer when accessing the IP network via a LAN or other connection.

For various applications, e.g., servicing of 911 emergency telephone calls, the SS 536 and/or other network devices coupled to the SMN 532 may request the location and/or other customer information associated with a particular IP address of interest, e.g., the IP address used to initiate a 911 calls from an IP telephone. As will be discussed below, the LCIS 534 includes routines for responding to such information requests.

Figure 6:
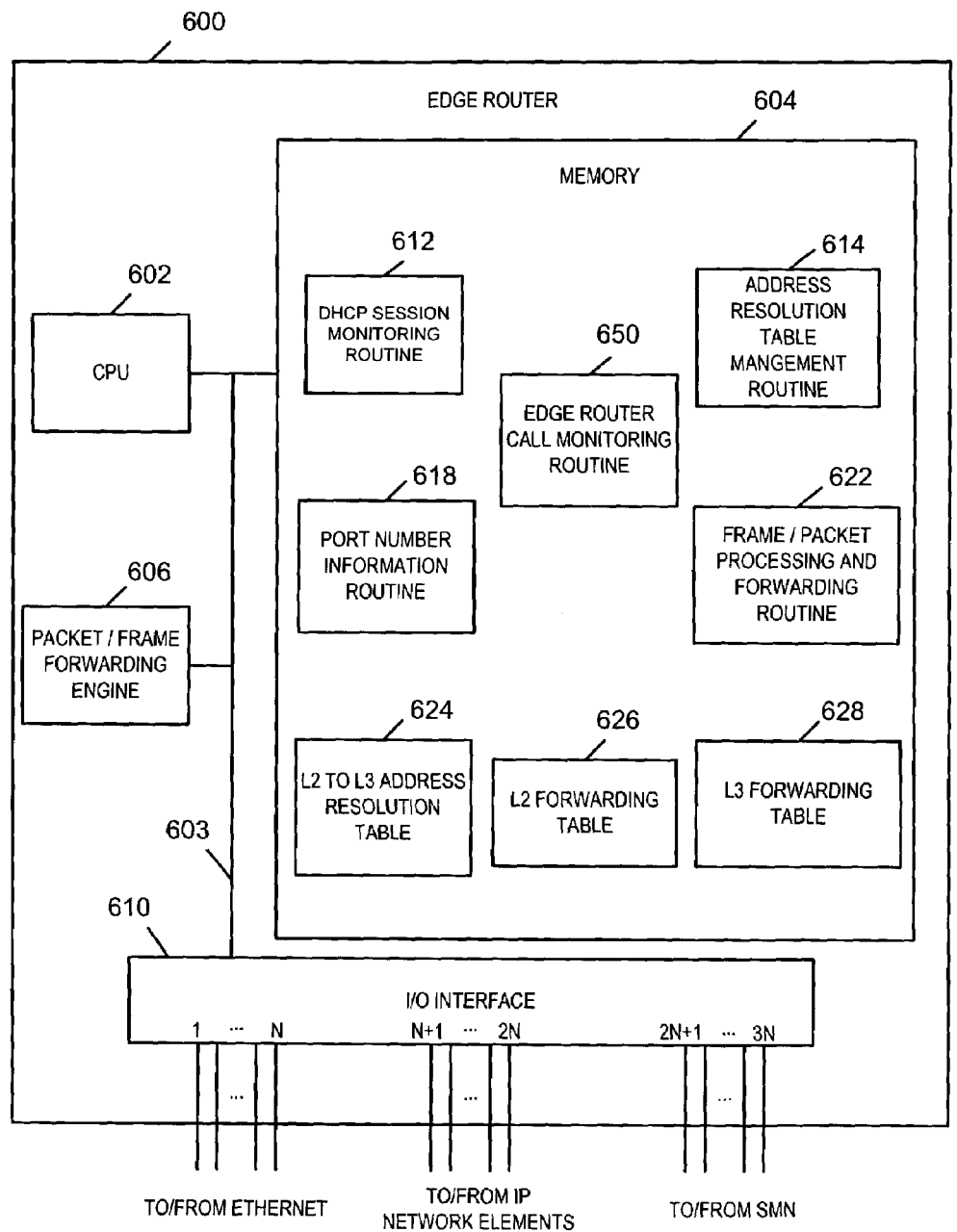
FIG. 6 illustrates an edge router implemented in accordance with the invention.

FIG. 6 illustrates an edge router 600 which may be used as any one of the edge routers 516, 518 of the system illustrated in FIG. 5. As illustrated, the edge router 600 includes a CPU 602, packet/frame forwarding engine 606, memory 704 and I/O interface 610 which are coupled together by a bus 603. The I/O interface 610 includes a plurality of ports used to connect the edge router 600 to various networks. Ports 1 through N are used to couple the router 600 to one or more Ethernet LANs. Ports N+1 through 2N are used to connect to elements of the IP network 505, e.g., DHCP server 520 and router R3 522 or R6 526, while Ports 2N+1 through 3N are used to couple the edge router 600 to the SMN and thus the LCIS 534 included therein.

The memory 604 includes, an edge router call monitoring routine 650, an L2 forwarding table 626, an L3 forwarding table 628, an L2 to L3 address resolution table 624, a frame/packet processing and forwarding routine 622, a DHCP session monitoring routine 612, address resolution table management routine 614, and port number information routine 618.

Edge router call monitoring routine 650 is responsive to commands to initiate monitoring and commands to terminate monitoring of IP packets including an IP address provided in conjunction with a command. In accordance with the present invention, in response to receiving a command to monitor for IP packets including a particular IP address, e.g., an IP address determined to correspond to a phone number to be monitored, call monitoring routine 650 initiates call monitoring in one of two possible ways.

In a first embodiment the monitoring routine 650 duplicates packets which include the specified IP address and then forwards the duplicated packets to communications monitoring station 560. In such an embodiment, duplicated packets may be stored in the edge router 516 until the communications monitoring station 560 requests that they be forwarded or immediately forwarded to the communications monitoring station. In such an embodiment, the original packets are allowed to continue onto their intended destination making the monitoring process transparent to the end users.

In the first embodiment, the duplicate packets are sent to communications monitoring station 560 via Layer 3 network 505 and/or via a separate private network. Encryption techniques may be used to protect the integrity of the duplicate packets and to prevent eavesdropping of monitored conversations. These duplicate packets are received at the communications monitoring station 560 and stored for later review.

In the second embodiment, monitoring routine 650 redirects packets that include the IP address associated with the received monitor command to the communications monitoring station 560. The packets are then copied and stored by the monitoring station 560 which then directs the packets to their original intended destination. In such an embodiment, packet duplication for wiretapping purposes occurs at the communications monitoring station 560. This second approach has the disadvantage compared to the first approach of introducing routing delays since packets are re-directed through the monitoring station 560 prior to reaching the originally intended destination.

In response to receiving a discontinue monitoring command, monitoring routine 650 discontinues the packet duplication and/or redirection of IP packets including an IP address associated with, e.g., included in, the received discontinue monitoring command.

Figure 16:
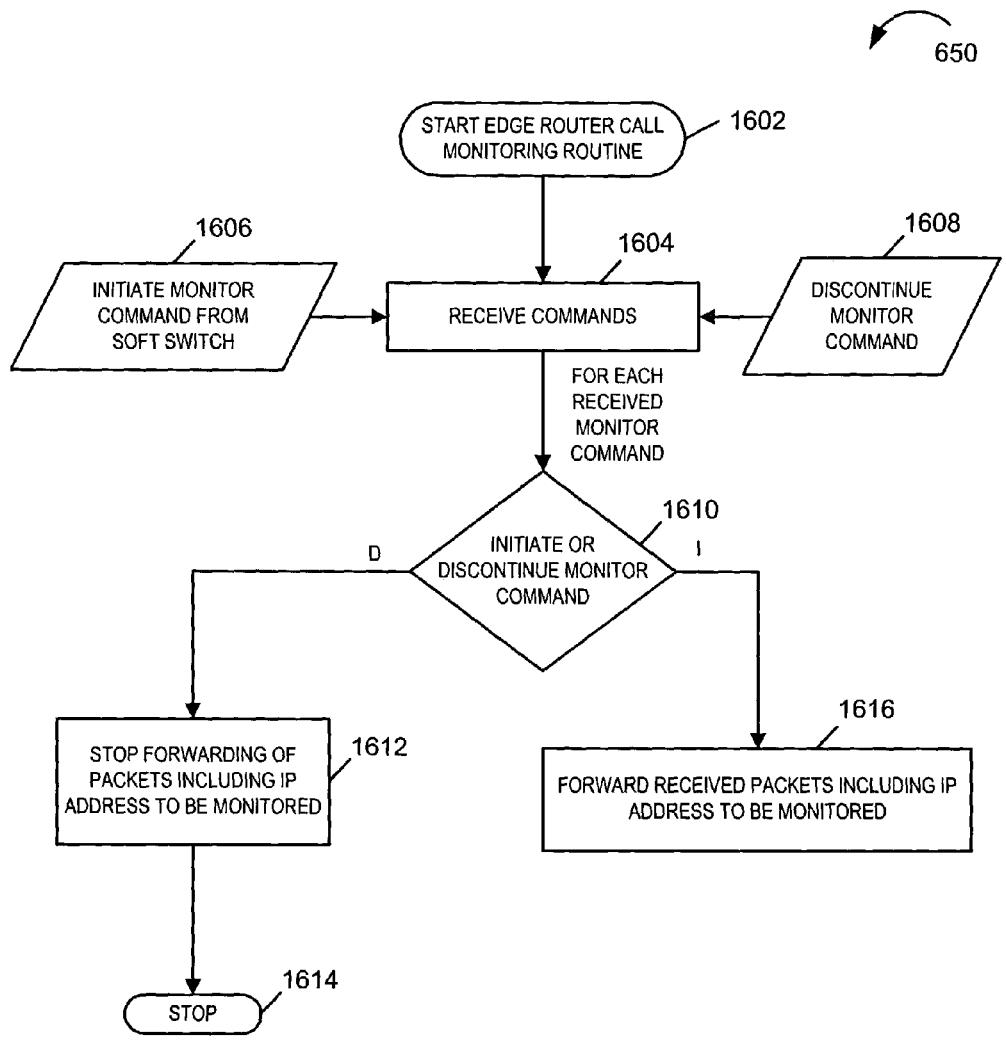
FIG. 16 illustrates a call monitoring routine implemented by an edge router in accordance with the present invention.

An exemplary monitoring routine 650 which operates in accordance with the first approach, will be discussed below in detail with regard to FIG. 16.

In addition to the call monitoring routine 650, the edge router includes various elements related to conventional frame and/or packet routing such as the Layer 2 forwarding table 626.

Figure 7:
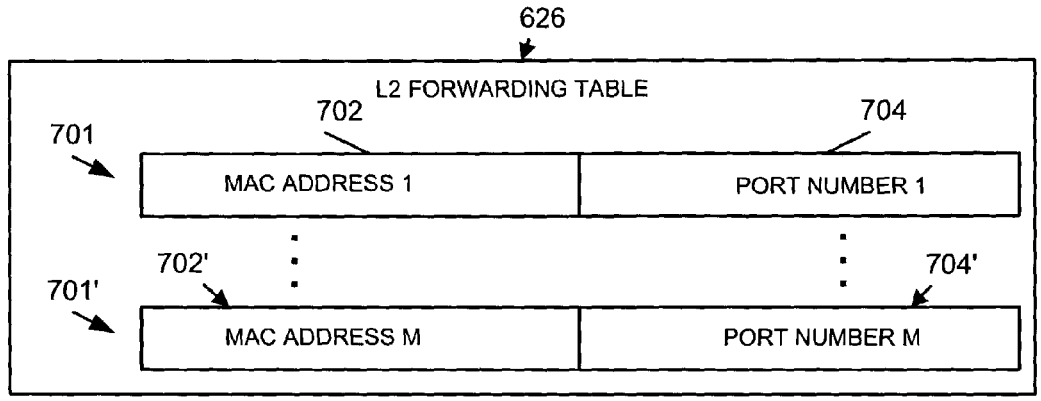
FIGS. 7-9 illustrate various tables included in the edge router of FIG. 6.

The Layer 2 forwarding table 626 includes information used for forwarding received Ethernet frames according to the MAC destination address specified in the frame's header. FIG. 7 illustrates an exemplary L2 forwarding table 626. The table includes a plurality of entries 701, 701'. Each entry includes a MAC address 702, 702' and a port number 704, 704'. Under direction of the forwarding routine 622, frames received by the edge router having a MAC address listed in the L2 forwarding table are output using the port 704, 704' corresponding to the destination MAC address. In this manner Ethernet frames are forwarded in the Layer 2 domain based on MAC destination addresses.

Figure 8:
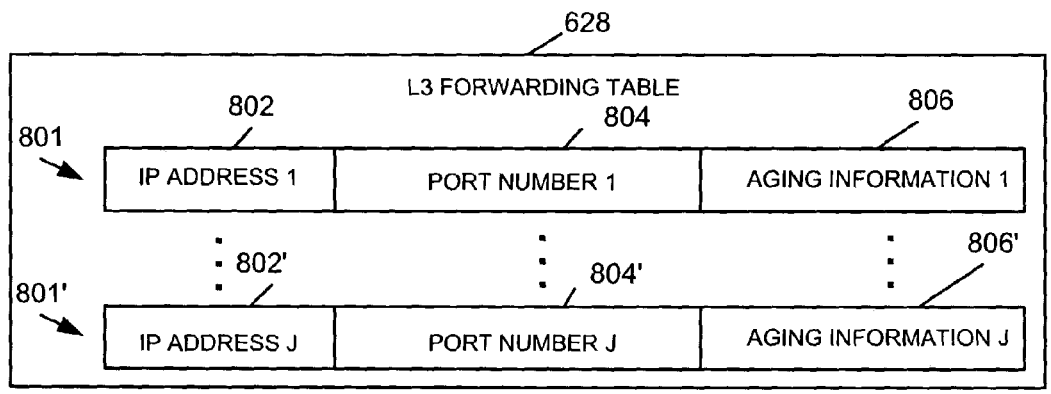

The Layer 3 (L3) forwarding table 628 is used by the router 600 to forward IP packets in the IP domain. As illustrated in FIG. 8, the L3 forwarding table includes a plurality of entries 801, 801'. Each entry includes an IP address 802, 802', a port number 804, 804' and aging information. The aging information is used to determine when an entry 801, 801' should be deleted from L3 forwarding table as part of a table maintenance operation. Under direction of the forwarding routine 622, IP packets received by the edge router 600 having a MAC address listed in the L2 forwarding table are output using the port 804, 804' corresponding to the destination IP address. In this manner IP packets are forwarded in the Layer 3 domain based on IP addresses.

Figure 9:
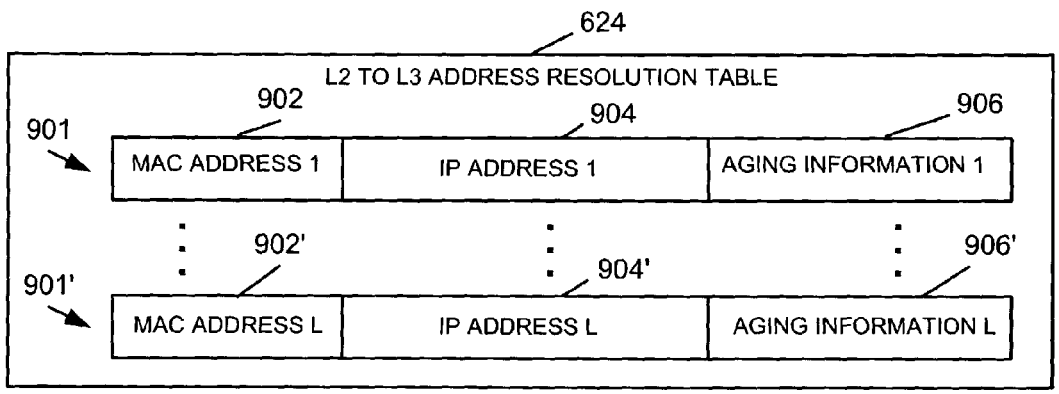

The L2 to L3 address resolution table 624, shown in FIG. 9, is used for converting between Layer 2, e.g., MAC, addresses and Layer 3, e.g., IP, addresses. The L2 to L3 address resolution table 624 includes a plurality of entries 901, 901'. Each entry includes a MAC address 902, 902', an IP address 904, 904' and aging information 906, 906'. As in the case of the L3 forwarding table 628, the aging information 906, 906' is used for table maintenance purposes.

When an IP packet is received which has a destination address not found in the L3 forwarding table 628, the forwarding routine 622 compares the received IP destination address to the entries in the L2 to L3 resolution table 624. If the IP address is listed in the table 624, the MAC address 902 or 902' corresponding to the received destination IP address 904 or 904', respectively, is retrieved from the L2 to L3 address resolution table. The MAC address is then used in a L2 forwarding table lookup operation. Using the MAC address as an index to the L2 forwarding table, an output port to be used for forwarding the information included in the received IP packet is determined. As part of the forwarding operation, content from the received IP packet is placed into the payload of an Ethernet frame and then transmitted to the appropriate Ethernet LAN via the port identified in the L2 forwarding table. In this manner, IP packets received from the IP network can be transmitted to devices over the Ethernet LAN coupled to the edge router 600.

In accordance with one feature of the invention, as an alternative to using address resolution protocol (ARP), the DHCP monitoring routine 611 snoops DCHP sessions between devices on the Layer 2 network, e.g., devices 208, 210 and the DHCP server 220. In this manner, the monitoring routine 611 obtains information on the assignment of IP addresses to devices and the release of IP address by devices. This information is conveyed to the address resolution table management routine 614 which updates the layer 2 to layer 2 (L2 to L3) address resolution table 624.

Address resolution table management routine 614 is responsible for removing, e.g., deleting, entries from the L2 to L3 address resolution table 624 and/or L3 forwarding table, after an entry has aged for a preselected period of time as indicated from the aging information stored for each entry. Alternatively, in the case where DCHP sessions are snooped in accordance with one feature of the invention, entries are deleted tables 624 and 628 when the IP lease time expires, a device releases an IP address, or a device fails to respond to a DHCP status inquiry. Thus, in such an embodiment, IP address entries are added to and deleted from tables 624, 628 based on information obtained from snooping communications between host devices on a layer 2 LAN coupled to the edge router 600 and the DHCP server 220.

Port number information routine 618 responds to port number information requests received by the edge router 600 by returning the port number corresponding to an IP address or MAC address received in a port number information request.

The routine 618 first determines whether an IP or MAC address has been received in a port number information request. If the request includes a MAC address, the received MAC address is used as an index into the L2 forwarding table to determine the router port corresponding to the received address. If an IP address is received as part of a port number information request, the IP address is first used as an index as part of a look-up into the L2 to L3 address resolution table 624. In this manner the MAC address corresponding to the received IP address is determined from the table 624. Once the MAC address is determined from table 624 it is used to consult the L2 forwarding table 626. In this manner, the router port corresponding to the MAC address is determined.

The router port number determined by port number information routine 618 is returned to the device which sent the router 600 a port number information request. In the case of a port number information request from the LCIS 534, the determined port number would normally be returned via the secure SMN 532 via which the request was received by the edge router 600.

Figure 10:
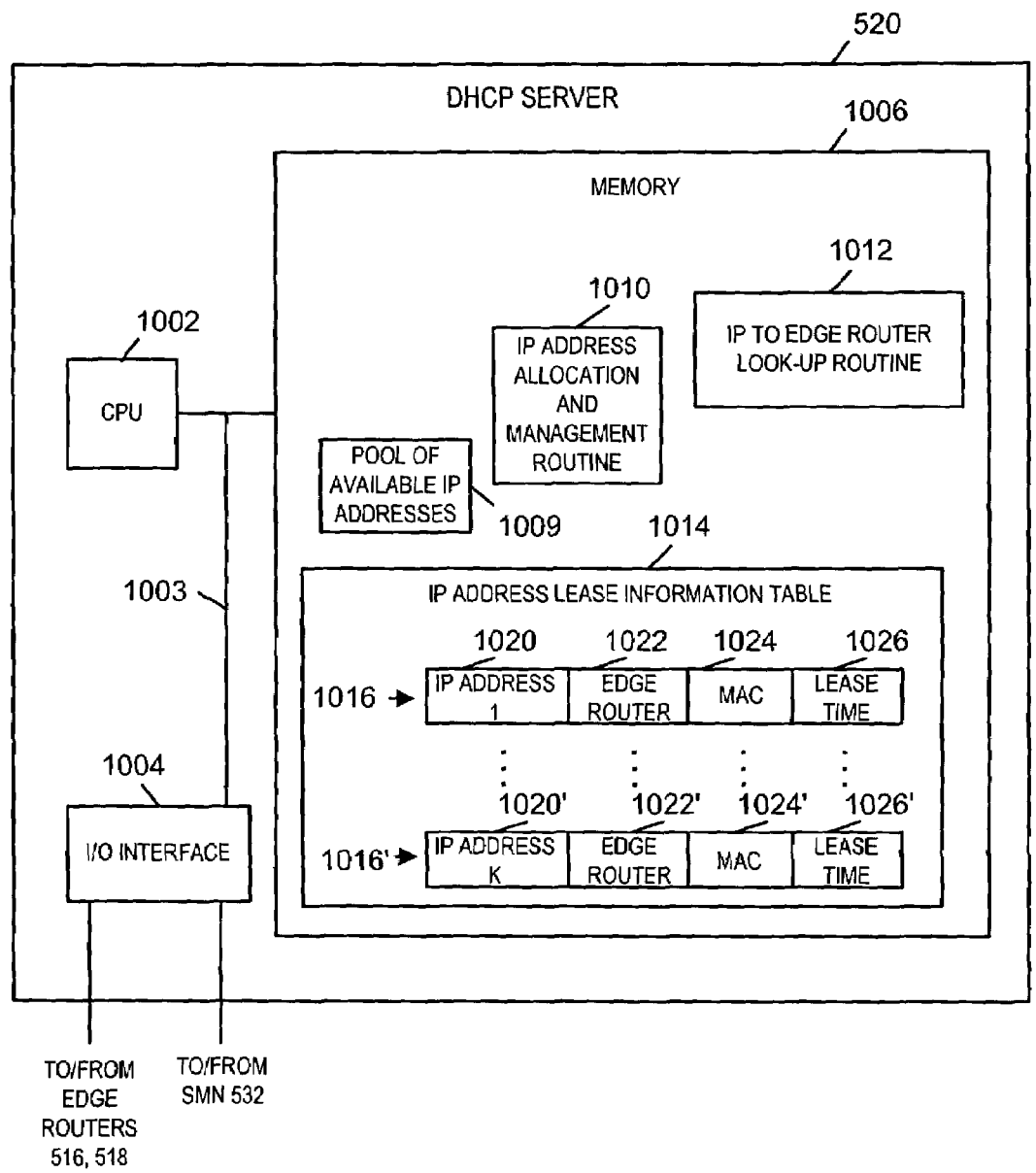
FIG. 10 illustrates a DHCP server responsible for dynamically assigning IP addresses and for storing information relating to said addresses in accordance with the present invention.

FIG. 10 illustrates a DHCP server 520 implemented in accordance with the present invention. As illustrated, the DHCP server 520 includes a CPU 1002, I/O interface 1004 and memory 1006 which are coupled together by bus 1003. The memory 1006 includes an IP address allocation and management routine 1010, IP to edge router and optionally MAC address look-up routine 1012, a pool of available IP addresses 1009, and an IP address lease information table 1014. The pool of available IP addresses 1009 is a list of unused IP addresses which the DHCP server 520 is authorized to lease to requesting devices. In accordance with the invention, the table 1014 is used to manage leased IP addresses and as an IP to edge router (IP2ER) look-up table for providing information on the edge router associated with an IP addresses.

When a device on a LAN, e.g., device 208 on LAN 204, needs an IP address so that it can access the IP network 505 it broadcasts an IP address assignment request. The request is detected by the edge router on the LAN, e.g. router 216. The edge router 516 responds by acting as a proxy of the requesting device 208 and initiating a DHCP session with the DHCP server 520.

This may be done as is known in the art using DHCP protocol. An IP address assignment request conveyed to the DHCP server 520 includes the MAC address of the requesting device. In response to an IP address assignment request, the DHCP server 520 assigns the requesting device 208 an available IP addresses from the pool 1009. In addition the server 520 removes the address from the pool 1009 and creates a new entry 1016 in the IP address lease information table 1014.

Each entry 1016, 1016' in the table 1014 includes the IP address assigned 1020, 1020', the edge router 1022, 1022' acting as proxy for the requesting device, the MAC address 1024, 1024' of the device to which the IP address was assigned, and lease time information 1026, 1026'. The lease time information 1026, 1026' indicates the term, e.g., duration, of the IP address lease and other lease related information. One entry 1016 or 1016' exists in the table 1014 for each IP address leased to a device by the DHCP server 520. In the exemplary embodiment of FIG. 10, the table 1014 includes entries for K leased IP addresses 1620 through 1620'.

When an IP address is assigned, i.e., leased, to a requesting device, the IP address and lease time information (indicating the duration of the lease) is communicated back to the requesting device by way of the edge router acting as the device's proxy.

Accordingly, as part of the DHCP server IP address leasing mechanism, a table 1014 associating assigned IP addresses with information identifying the edge router used by the device assigned the IP address to access the IP network 505 and the devices MAC address.

Edge router information requests, e.g., requests from the LCIS 534, may be received by the DHCP server 520 via SMN 532. IP to edge router look-up routine 1012 is responsible for responding to such requests by correlating an edge router to an IP address received in the information request. To determine the edge router corresponding to an information request, the look-up routine 1012 accesses the IP address lease information table 1014 using the received IP address as an index into the table. In this manner, the look-up routine 1012 retrieves the information 1022, 1022' identifying the edge router corresponding to the received IP address. In some embodiments, the routine 1012 also recovers from the table 1014, the MAC address corresponding to the received IP address. The information identifying the edge router, and, optionally, the MAC address, corresponding to a received IP address is returned to the device, e.g., LCIS 534, which sent the edge router information request to the DHCP server. In this manner, devices such as the LCIS can obtain from the DHCP server information identifying the edge router being used by a device having a specific IP address.

Figure 11:
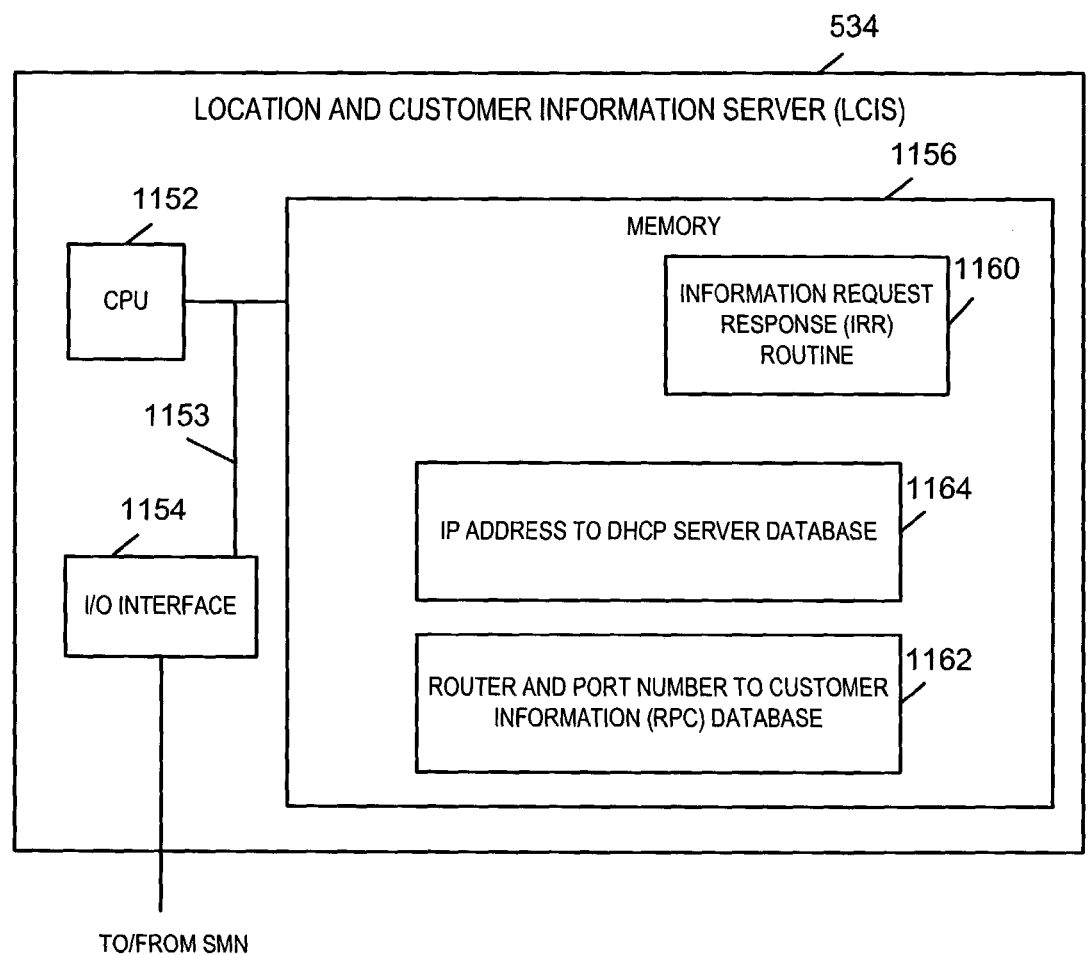
FIG. 11 illustrates a location and customer information server (LCIS) implemented in accordance with the invention.

FIG. 11 illustrates a location and customer information server (LCIS) 534 implemented in accordance with the invention. For security reasons, the LCIS 534 is implemented as part of the SMN 532. However, it could, alternatively, be implemented as a device on the IP network 505 assuming sufficient security measures are taken, e.g., the use of a firewall and/or data encryption, to protect the server and its contents from unauthorized access and/or tampering.

The LCIS 534 includes a central processing unit 1152, I/O interface 1154 and memory 1156 which are coupled together by bus 1153. The CPU 1152 controls operation of the LCIS under direction of one or more routines stored in memory 1156. The I/O interface 1154 couples the internal components of the LCIS 534 to external devices via the communications links of the SMN 532. For example, in the FIG. 5 embodiment, the LCIS 534 is coupled to the edge routers 516, 518, SS 536 and DHCP server 520 via communications links of the SMN 532.

The memory 1156 includes an IP address to DHCP server database 1164, and an edge router and port number to customer information (RPC) database 1162, and an information request response routine 1160.

The IP address to DHCP server database 1164, includes information correlating IP addresses which may be assigned by DHCP servers to particular DCHP servers in the IP network. Thus, the LCIS 534 is able to determine which DHCP server 520, out of a plurality of such servers, to contact for information regarding an IP address received as part of an information request.

The RPC database 1162 includes information correlating specific edge routers and ports to customer information including, e.g., physical location, name and landline telephone number information.

Figure 12:
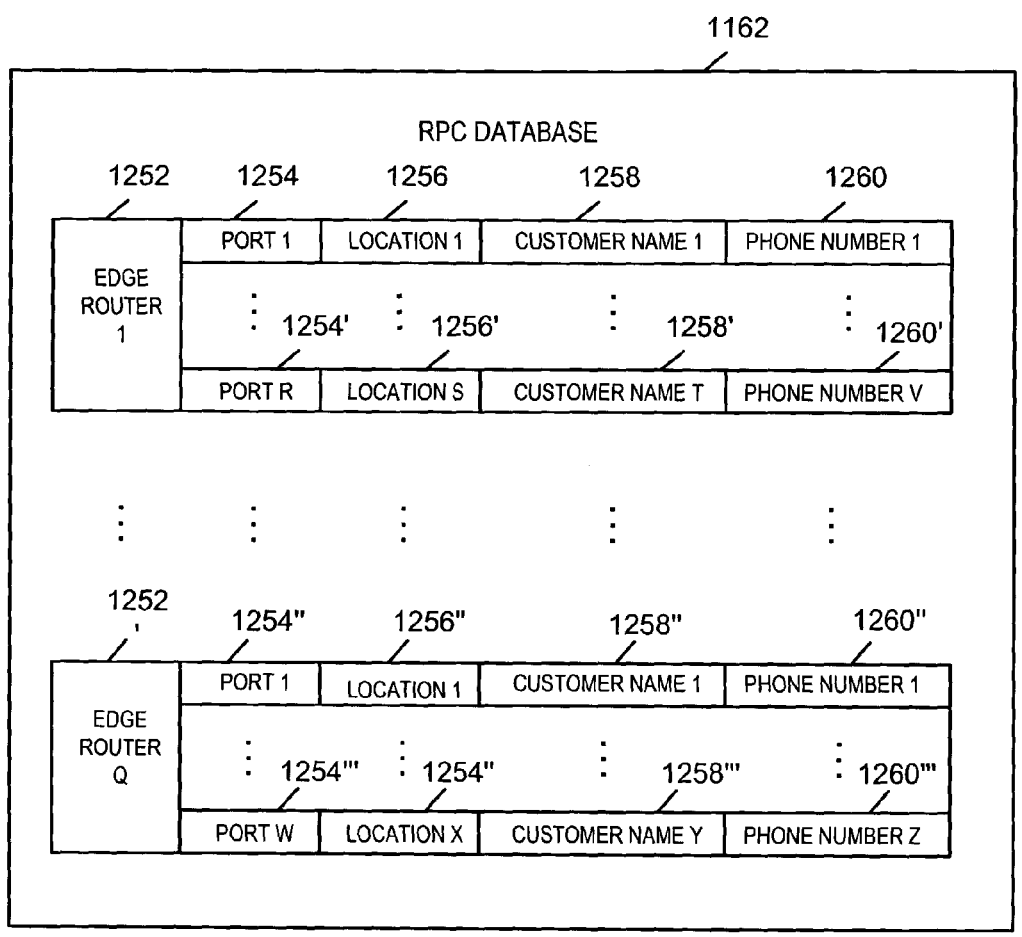
FIG. 12 illustrates a router and port number to customer (RPC) information database implemented in accordance with the invention.

FIG. 12 illustrates an exemplary RPLC database 1162. As illustrated the exemplary database includes Q records one record corresponding to each of Q edge routers. Each record includes a router identifier 1252, 1252' and a set of entries corresponding to particular router ports. Each router port entry includes a port identifier 1254, a location identifier 1256, customer name information 1258 and telephone number information 1260. The location information is the location of the customer premise, e.g., physical LAN location, from which the customer may access the IP network via the identified router and port. The phone number 1260 is the telephone number of a landline phone located at the corresponding physical location specified in the edger router/port entry. Additional customer information, e.g. billing, service subscription and level of desired privacy information, may also be included in the RPLC database 1162 for each router/port entry. The RPLC database 1162 is populated as subscribers contract with an IP service provider for IP service and is updated, e.g., periodically, to reflect changes in the customer information and/or the cancellation or modification of service.

The information request response routine (IRR) 1160 responds to requests for location and/or other customer information corresponding to an IP address. The IP address of interest and, optionally, the desired type of information, is included in an information request. Such information requests may come from a variety of sources, e.g., routers and/or servers implementing security routines, soft switch 536, etc.

Figure 13:
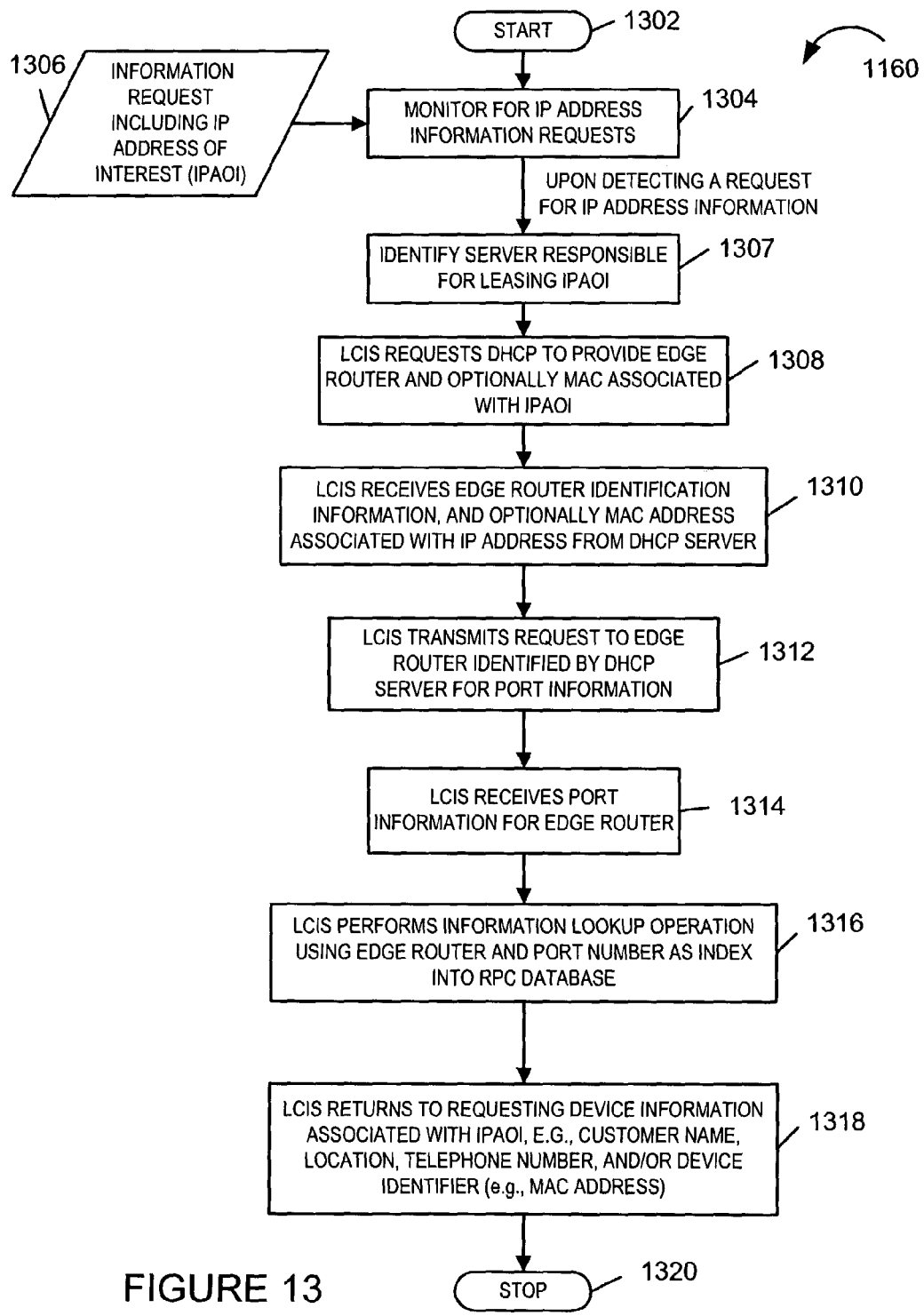
FIG. 13 illustrates a routine for providing customer information corresponding to an IP address in response to information requests.

An exemplary IRR routine 1160 will now be discussed with reference to FIG. 13. The IRR routine 1160 begins in step 1302 where it is executed by the CPU 1152, e.g., when the LCIS 534 is activated. Then in step 1304 the routine 1160 monitors for an information request 1306 including an IP address of interest (IPAOI). For each such detected IP address information request, operation proceeds to step 1307.

In step 1307 the LCIS 534 identifies, e.g., by querying its IP address to DHCP server database 1164, the DHCP server responsible for leasing the IPAOI to a device. Then, in step 1308, the LCIS 534 sends a message, including the IPAOI, to the identified DHCP server requesting information, e.g., edge router and MAC address information, corresponding to the IPAOI.

In step 1310, in response to the information request sent to the DHCP server, the LCIS 534 receives edge router identification information and, in some embodiments, the MAC address of the device to which the IPAOI was leased. Then in step 1312, the LCIS 534 transmits a request to the edge router identified by the DHCP server for port information relating to the IPAOI. The port number information request transmitted to the identified edge router includes, when available, the MAC address received from the DHCP server in addition to, or instead of, the IPAOI.

In response to the port information request message, in step 1314, the LCIS 534 receives from the contacted edge router, the edge router port number corresponding to the supplied IPAOI or MAC address. Then, in step 1316, the LCIS 534 accesses the RPLC database 1162 using the router and port number corresponding to the IPAOI to retrieve there from the requested location and/or customer information determined to correspond to the IPAOI.

Once the desired information, e.g., customer name, location, telephone number is retrieved from the RPLC database, in step 1318 it is returned to the device which requested information corresponding to the IPAOI. The MAC address may also be returned to the requesting device where device identification information is desired.

Once the requested information corresponding to the IPAOI has been transmitted to the requesting device, e.g., over the secure SMN 532, processing of the received IP address information request stops in step 1320. However, the monitoring operation of step 1304 and processing of other IP address requests will continue until the routine 1160 is terminated, e.g., by the LCIS 534 being turned off or shut down.

Various additional embodiments will be apparent to those skilled in the art in view of the above description. For example, rather than return location and/or other customer information, in cases where only reliable device identification information is required, the LCIS could return, e.g., the MAC address corresponding to an IPAOI, without the other customer information. Such an embodiment would be useful e.g., in cases where services were to be limited to specific physical devices.

Figure 14:
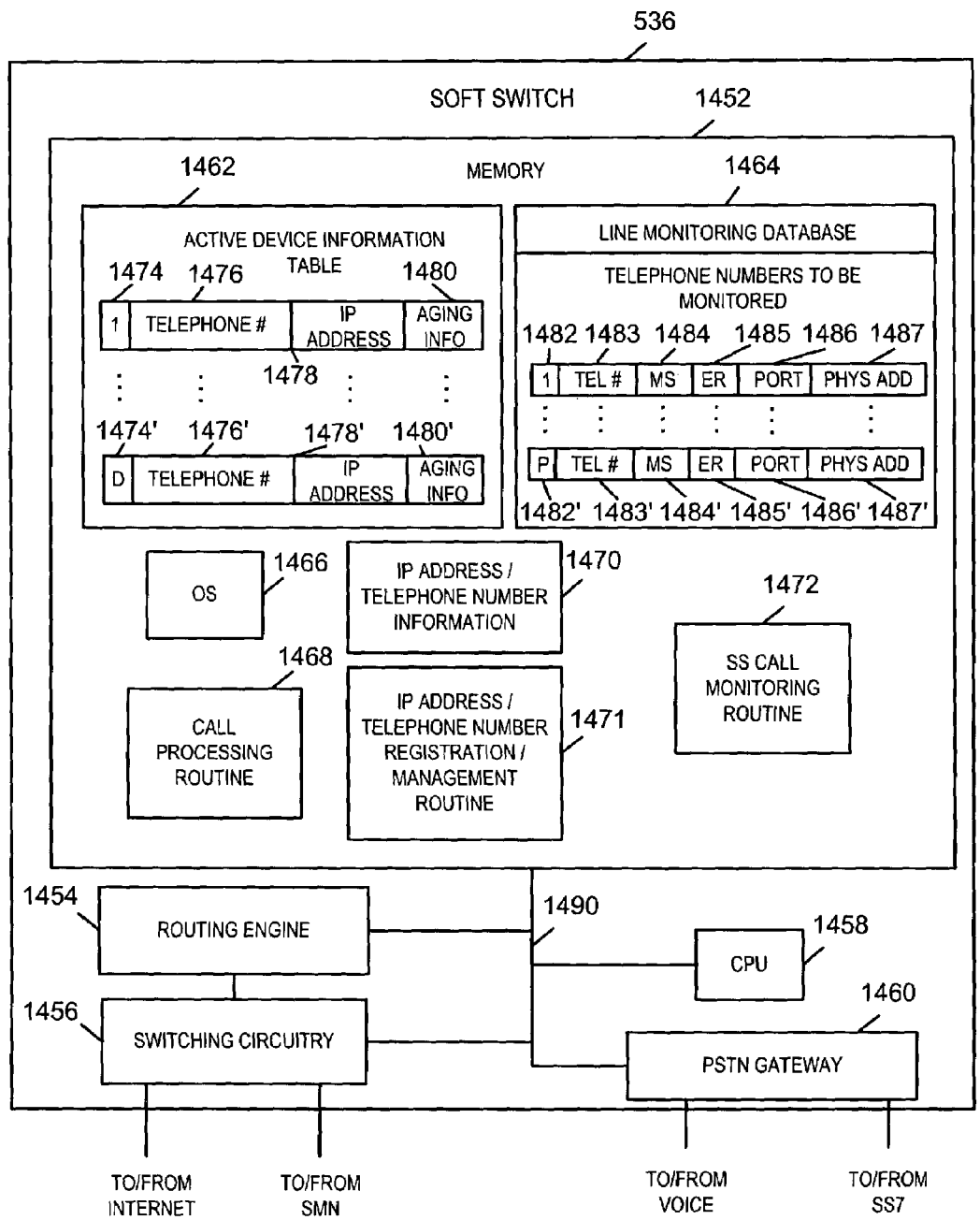
FIG. 14 illustrates a soft switch implemented in accordance with the present invention.

FIG. 14 illustrates a soft switch 536 implemented in accordance with the present invention. As illustrated in FIG. 14, soft switch 536 includes CPU 1458, routing engine 1454, switching circuitry 1456, PSTN gateway 1460, and memory 1452, which are coupled together by bus 1490.

Memory 1452 includes operating system 1466, call processing routine 1468, IP address/telephone number information 1470, IP address/telephone number registration/management routine 1471, soft switch monitoring routine 1472, active device information 1462, and line monitoring database 1464.

As discussed earlier, when a device, e.g. device 1 208, couples itself to the Ethernet LAN 204, it will usually proceed to obtain an IP address, in order to access IP network 505. After acquiring an IP address form the DHCP server 520, if device 1 208 is an IP telephone, the telephony device registers with the soft switch 536. This registration allows device 1 208 to communicate with other telephones, and allows telephone companies to keep track of the users on their network for billing and/or other purposes.

As part of the registration process, a device's telephone number is associated in a database with the device's current IP address. IP address aging information is also normally stored for each IP address. The stored information makes telephone number to IP address conversions required for proper call routing possible.

The registration information is used for routing calls as follows. When a user dials a number on an IP phone registered with soft switch 536, local soft switch 536 is contacted to determine the IP address of the dialed number or whether the call needs to be routed to the PSTN. Soft switch 536 uses IP address/telephone number information 1470 and/or other telephone number routing information, to determine if the number is an IP telephone number or a PSTN telephone number. If the number is an IP number the call is routed using the routing engine 1454. If the dial number is to a PSTN telephone number the call is routed through the PSTN gateway 1460. Incoming telephone calls routed through soft switch 536 from either the IP-based telephone network or the PSTN are checked by the call processing routine 1468 and routed based on the telephone number and/or IP address information included in the control/routing information included with the received call.

The soft switch telephone registration process used to create the database of information used for IP telephone call routing will now be described. IP address/telephone number registration/management routine 1471 handles the registration of IP devices. Registration routine 1471 is responsible for receiving IP addresses, IP address aging information, and device identifier information, e.g., telephone number and/or MAC address information. Information on active devices is stored in active device information table 1462 of memory 1452 by the routine 1471. This table 1462 includes information on a plurality of D active devices numbered from 1 to D 1474, 1474'. Each active device has associated with it a telephone number 1476, 1476', an IP address 1478, 1478', and IP address aging information 1480, 1480', respectively.

For purposes of criminal investigations, national security, etc, the government sometimes seeks to record the telephone conversations of suspect individuals. This is generally known as wiretapping. Wiretaps are often authorized for a specific telephone number thereby providing legal authority to monitor and record calls associated with, e.g., to or from, a particular telephone number. The telephone numbers which are to be wiretapped are stored in the line monitoring database 1464.

Each entry in the database 1464 corresponds to a telephone line, e.g., number, to be monitored and includes a telephone number 1483, 1483', monitoring status information 1484, 1484', edge router information 1485, 1485', port number information 1486, 1486', and physical address information 1487, 1487', respectively. The telephone numbers to be monitored 1483, 1483' are updated regularly by the communications monitoring station 560. Updates may be performed using encryption over the IP network 505. The edge router, port number, and physical address fields 1485, 1486, 1487 are populated with information retrieved by the soft switch monitoring routine 1472 as will be discussed below.

Monitoring normally occurs when a device corresponding to a telephone number to be wiretapped is registered with the soft switch 536. Since IP telephony devices are often registered only some of the time, monitoring of a telephone number to be wiretapped will normally occur only when a device is registered to use the telephone number to be wiretapped. The purpose of the monitoring status information 1484, 1484' is to indicate when monitoring is being performed. The monitoring status information 1484, 1484' includes a one bit flag, e.g., "1" for a number that is currently being monitored, and a "0" for a number that is not being monitored.

Soft switch monitoring routine 1472 is responsive to the registration of an IP telephony device with soft switch 536. In response to the registration of a telephony device the monitoring routine 1472 determines if the registering device corresponds to a telephone number to be monitored. This is done by comparing a telephone number associated with the registering telephone to the telephone numbers listed in line monitoring database 1464 to determine if there is a match. If the registering telephony device uses a telephone number to be monitored, monitoring routine 1472 prepares the network for the monitoring of the marked phone line as will be discussed further below in regard to FIG. 15.

Routing engine 1454 using switching circuitry 1456 to receive and transmit data to/from the IP based network 505. This data may include IP telephone call routing information requests and responses as well as voice data to be routed. Routing engine 1454 has access to the SMN 532 through the switching circuitry 1456. The SMN include the LCIS database 534, which the soft switch 536 uses to populate portions of its line monitoring database 1464.

PSTN gateway 1460 receives and transmits data from the PSTN. It can transmit and receive packets to and from the IP network 505, and transmit and receive voice data to and from the PSTN. The PSTN gateway also has SS7 connectivity to PSTN control elements for receiving/transmitting control information including, e.g., call processing and/or routing information. In the FIG. 14 embodiment, the PSTN gateway 1460 is illustrated as part of the soft switch 536. However, it may be, and often is, implemented as a separate entity which is coupled to the soft switch 536. Accordingly, the FIG. 14 embodiment is intended to be exemplary but in no way limits or requires, for purposes of the invention, that the PSTN gateway 1460 be implemented as an element of the soft switch 536.

While shown as part of the soft switch 536 the PSTN gateway may be implemented as a separate module from the soft switch 536. In one such embodiment the soft switch 536 is coupled to a separate PSTN gateway 1460 through an IP network. In this configuration, a plurality of soft switches 536 can share the same PSTN gateway 1460.

Figure 15:
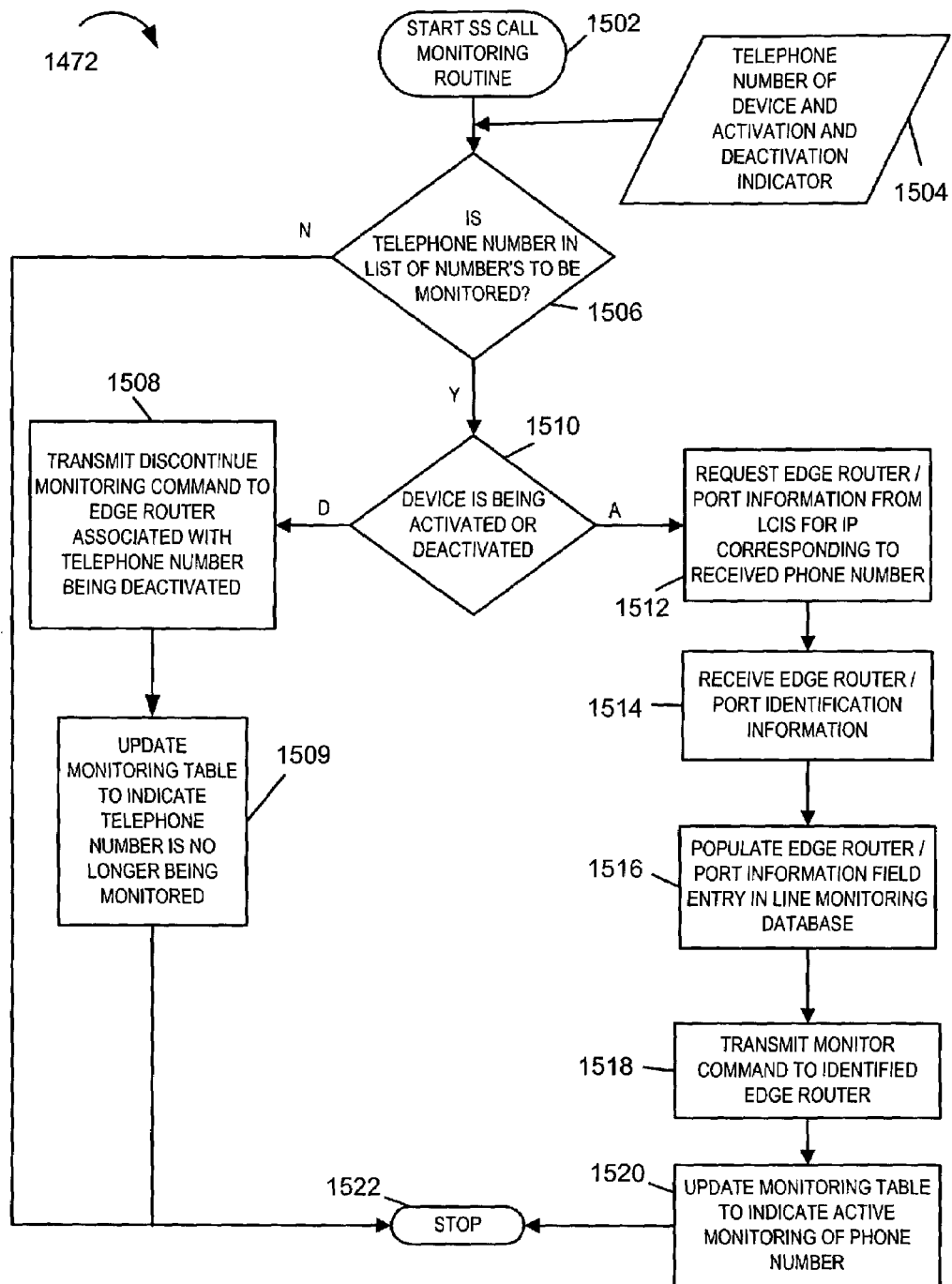
FIG. 15 illustrates a call monitoring routine implemented by a soft switch in accordance with the present invention.

The steps of an exemplary soft switch call monitoring routine 1472 implemented in accordance with the present invention will now be discussed with reference to the flow chart of FIG. 15. In this example device 3 212 of FIG. 5 corresponds to a phone number marked for monitoring. Information corresponding to device 3 212, is assumed for purposes of explanation to be located in the first row of the line monitoring database 1464.

The soft switch call monitoring routine 1472 starts in step 1502 wherein it is loaded and executed by the soft switch's CPU 1458. Operation proceeds from start step 1502 to monitoring step 1506.

In step 1506 the routine 1472 monitors to detect registration/de-registration information 1504 indicating the telephone number of a device and whether the device is registering or being removed from the list of registered devices. The telephone number included in information 1504 is compared in step 1506 to the line monitoring database's list of telephone numbers to be monitored to determine if the telephone number is on the list and is to be monitored. If the phone number is not on the list of numbers to be monitored, the routine monitoring stops processing of the received telephone number and corresponding activation/deactivation information in step 1522 without taking further action. However, it should be noted that step 1506 is performed on an ongoing basis and monitoring for other registration information 1504 to be processed will continue.

If the telephone number received in information 1504 is on the list of numbers to be monitored, operation will proceed from step 1506 to decision step 1510. In decision step 1510 the soft switch 536 determines if the indicator 1504 received in step 1504 indicates that the device indicates an activation (registration) or a deactivation (deregistration) of a device. Deregistration may be initiated automatically by the soft switch, e.g., when the aging indicator associated with a devices assigned IP address indicates it is no longer valid. Alternatively, deregistration may occur when the registered telephony device initiates a deregistration process.

If the telephone number is to be activated processing proceeds from step 1510 to step 1512.

In step 1512 the soft switch 536 requests edge router and port number information from LCIS 534. As part of the request for information, the soft switch 536 transmits the IP address corresponding to the phone number of the registering device to be monitored which was detected in step 1506. The LCIS 534 operating under the control of the previously discussed information request response (IRR) routine 1160 uses the transmitted IP address to retrieve information corresponding to the phone number to be monitored, e.g., corresponding customer name, physical location, edge router, and port number information. This information is transmitted to the soft switch 536 and used to populate the corresponding information fields of the line monitoring database 1464.

Following transmission of the information request, in step 1514, the soft switch receives the edge router and port identification information correlating to the IP address of the registering phone number to be monitored. In step 1516, the soft switch 536, populates its line monitoring database 1464 with the returned information. Thus edge router, port number and physical address fields 1485, 1486, and 1487 are loaded with the information received from the LCIS 534.

In step 1518, with the line monitoring information corresponding to the registering device now having been populated, the soft switch 536 transmits a monitoring command to the identified edge router in field 1485 which corresponds to the telephone number of the registering device to be monitored. The monitor command normally includes the IP address corresponding to the telephone number to be monitored.

In response to the monitor command the edge router forwards packets that include the supplied IP address to communications monitoring station 560. As discussed above, the forwarded packets may be duplicated packets or the original packets received by the edge router instructed to implement the monitoring operation.

From step 1518 operation proceeds to step 1520, wherein the soft switch updates the monitoring status field 1484 to indicate activate monitoring of the phone number in field 1483, e.g., field 1484 is set to "1". The processing of the registration information detected in step 1506 then stops in step 1522, while the soft switch 536 continues to monitor for registration and device activation and/or deactivation information.

Returning to decision step 1510, if the soft switch 536 determines the indicator received in step 1504 indicates a deactivation (deregistration) operation is to be performed for the device corresponding to the detected telephone number, the method proceeds to step 1508. In step 1508, the soft switch 536 transmits a discontinue monitoring command to the edge router associated with the telephone number being deactivated. The discontinued monitoring command normally includes the IP address associated with the telephone number which is no longer to be monitored. In this manner, the edge router knows which packets no longer need be forwarded to the monitoring station. In addition to transmitting the command to stop monitoring, in step 1509 the soft switch 536 sets the monitoring status field 1484 to indicate that monitoring is no longer being performed for the telephone number associated with the deactivation indicator, e.g., the monitoring status field is set to "0". Based on the monitoring status field being set to "0", it is clear that the edge router, IP address and other information corresponding to a telephone number to be monitored, obtained at device registration time, ceases to be reliable information. Operation proceeds from step 1509 to stop step 1522.

In the above described manner, a soft switch 536 is able to start/stop monitoring of calls corresponding to specific IP telephony devices based on the device's telephone numbers and the devices assigned IP address which may vary over time regardless of the device's point of attachment to the IP network.

An exemplary edge router call monitoring routine 650 will now be discussed with reference to FIG. 16.

Edge router call monitoring routine 650 starts with step 1602. In this exemplary method the edge router 518 receives either an initiate monitor command or a discontinue monitor command. The received command includes an IP address or has an IP address associated with it, e.g., in a related data or parameter field, used to specify IP packets to be monitored.

After the start of the edge router call monitoring routine 1602, e.g., with the edge router executing the routine on power up, the routine 1602 operates in step 1604 to receive monitor commands on an on going basis. The monitor commands may be, e.g., an initiate monitor command 1606 or a discontinue monitor command 1608 each of which normally has an IP address associated with it.

Each command received by the edge router in step 1604 is processed beginning with decision step 1610. If in step 1610 it is determined that an initiate monitoring command was received, processing proceeds to step 1616. In step 1616 the edge router forwards any packets it receives which include the indicated IP address, e.g., in either source or destination address fields, to the monitoring system 560. Packet forwarding may involve simple redirection of packets the monitoring station 560. Alternatively, the packets including the specified IP address are duplicated and the duplicated packets are forwarded to the monitoring station 560 while the original packets are allowed to continue on to their original destination generally unaffected by the monitoring process. The duplication and forwarding processes may involve recording of the duplicated packet flow and eventual forwarding in response to a forwarding request message received by the edge router from the monitoring system 560.

Forwarding of packets in step 1616 will continue until the edge router receives a discontinue monitoring command including the IP address being monitored.

When it is determined in step 1610 that a discontinue monitoring command 1606 was received by the edge router, operation proceeds to step 1612 wherein the forwarding of packets including the IP address associated with the received discontinue monitoring command is stopped. In the case of packet duplication this involves ceasing the duplication and forwarding of IP packets. In the case of packet redirection id includes ceasing the redirection process and allowing IP packets including the indicated IP address to be routed in a normal manner. Operation proceeds from step 1612 to stop step 1614.

In accordance with one feature of the present invention, when the soft switch becomes aware of a change in the IP address associated with a telephony device corresponding to a telephone number being monitored, the soft switch transmits and update monitoring command to the edge router corresponding to the IP telephony device who's IP address is being changed. The IP telephony device's old and new IP address is transmitted with the update message and may be included as part of the message. In response to receiving a monitoring update message an edge router ceases to forward packets including the old IP address to the monitoring station and begins forwarding packets including the new IP address being used by the IP telephony device being monitored. Such updates may occur periodically as a device being monitored is assigned new IP addresses, e.g., due to dynamic IP address leasing or for other reasons. Such changes in IP address information are normally conveyed to the soft switch as part of an IP telephony registration update process performed to keep the soft switch's routing information current.

In addition to update messages, the soft switch will transmit discontinue monitoring commands to edge routers performing monitoring operations when the IP address aging information stored in the soft switch indicates that the IP address lease has timed out and is therefore no longer being used by the device to be monitored or when a IP telephony device de-registers, e.g., as part of a normal disconnect operation.

In the above described manner, IP telephony calls may be wiretapped without the unintentional monitoring of IP communications corresponding to user's and/or devices for which a wiretap is not authorized.

Numerous variations on the above described methods and apparatus are possible without departing from the scope of the invention.

What is claimed is:

1. A method of monitoring IP telephone calls routed over at least a portion of an IP network, the method comprising:
    maintaining, in a memory, a list of telephone numbers to be monitored;
    determining during registration of an IP telephony device if the IP telephony device corresponds to a telephone number to be monitored by determining if said list includes a telephone number corresponding to said IP telephony device;
    in response to determining that said IP telephony device corresponds to a telephone number to be monitored, obtaining information identifying the edge router through which said IP telephony device is coupled to the IP network;
    transmitting a monitor command with an IP address being used by said IP telephony device to the identified edge router; and
    operating the identified edge router to forward packets including the IP address transmitted with said monitor command to a monitoring station, by operating the identified edge router to duplicate packets including the IP address transmitted with the monitor command and forwarding the duplicated packets to said monitoring station.

2. The method of claim 1, further comprising the step of:
    transmitting a monitoring update command to the identified edge router an response to determining that the IP address used by said IP telephony device has changed.

3. The method of claim 2, wherein the monitoring update command includes the IP address sent with the previously transmitted monitor command and a new IP address being used by said IP telephony device.

4. The method of claim 3, further comprising:
    transmitting a discontinue monitoring command to said identified edge router in response to IP address aging information indicating that the IP address supplied with the transmitted monitoring command is no longer valid for use by said IP telephony device.

5. The method of claim 1, further comprising:
    transmitting a discontinue monitoring command to said identified edge router in response to IP address aging information indicating that the IP address supplied with the
    transmitted monitoring command is no longer valid for use by said IP telephony device.

6. The method of claim 1, wherein said determining step is performed by a soft switch used to control telephone call routing in said IP network when said IP telephony device registers with said soft switch.

7. A method of monitoring IP telephone calls routed over at least a portion of an IP network, the method comprising:
    operating a processor to determine if an IP telephony device corresponds to a telephone number to be monitored;
    in response to determining that said IP telephony device corresponds to a telephone number to be monitored, obtaining information identifying the edge router through which said IP telephony device is coupled to the IP network;
    transmitting a monitor command with an IP address being used by said IP telephony device to the identified edge router; and
    operating the identified edge router to forward packets including the IP address transmitted with said monitor command to a monitoring station, by operating the identified edge router to duplicate packets including the IP address transmitted with the monitor command and forwarding the duplicated packets to said monitoring station.

8. The method of claim 7, wherein the edge router allows one of each duplicated packet to be routed to the original packet destination.

9. An apparatus for use in monitoring IP telephone calls routed over at least a portion of an IP network, the apparatus comprising:
    a processor for determining during registration of an IP telephony device if the IP telephony device is to be monitored by determining if a telephone number on a list of telephone numbers to be monitored corresponds to said IP telephony device;
    means for obtaining information identifying the edge router through which said IP telephony device is coupled to the IP network;
    means for transmitting a monitor command with an IP address being used by said IP telephony device to the identified edge router when it is determined that the IP telephony device corresponds to a telephone number to be monitored; and
    means for operating the identified edge router to forward packets including the IP address transmitted with said monitor command to a monitoring station, by operating the identified edge router to duplicate packets including the IP address transmitted with the monitor command and forwarding the duplicated packets to said monitoring station.

10. The apparatus of claim 9, wherein said apparatus is a soft switch, the soft switch including:
    means for performing an IP telephony device registration operation.

11. The apparatus of claim 10, wherein said soft switch includes a list of IP telephony devices associated with telephone numbers which are being monitored and information identifying an edge router associated with each listed IP telephony device.

12. The apparatus of claim 11, further comprising:
    means for transmitting a discontinue monitoring command to an edge router associated with a listed ID telephony device in response to the listed IP telephony device de-registering with said soft switch.

13. A method of monitoring IP communications routed over at least a portion of an IP network, the method comprising:
    operating a processor to determine, during registration of an IP communications device, if the IP communications device is to be monitored by determining if a telephone number on a list of telephone numbers to be monitored corresponds to said IP communications device;
    in response to determining that the IP communications device is to be monitored, obtaining information identifying the edge router through which said IP communications device to be monitored is coupled to the IP network;
    transmitting a monitor command with an IP address being used by said IP communications device to be monitored to the identified edge router; and
    operating the identified edge router to forward packets including the IP address transmitted with said monitor command to a monitoring station, by operating the identified edge router to duplicate packets including the IP address transmitted with the monitor command and forwarding the duplicated packets to said monitoring station.

14. The method of claim 13, wherein said determining step is performed when an IP communications device registers for IP communications routing purposes.

15. The method of claim 13, further comprising the step of:
transmitting a monitoring update command to the identified edge router in response to determining that the IP address used by said IP communications device to be monitored has changed.

16. The method of claim 15, wherein the original IP address used by said IP communications device to be monitored and a new IP address being used by said IP communications device to be monitored is transmitted with said monitoring update command.

* * * * *